United States Patent [19]

Jannotta et al.

[11] Patent Number: 5,048,560

[45] Date of Patent: Sep. 17, 1991

[54] SEALING VALVE ASSEMBLY

[75] Inventors: Louis J. Jannotta, Orland Park; Raymond G. Reip, Indian Head Park, both of Ill.

[73] Assignee: L&J Engineering Inc., Crestwood, Ill.

[21] Appl. No.: 568,474

[22] Filed: Aug. 16, 1990

Related U.S. Application Data

[63] Continuation-in-part of Ser. No. 448,874, Dec. 12, 1989, abandoned.

[51] Int. Cl.⁵ ............................................. F16K 17/194
[52] U.S. Cl. ................................ 137/493.8; 137/533.31; 251/333
[58] Field of Search ............... 137/493.8, 493.9, 494, 137/533.31; 251/175, 368, 333

[56] References Cited

U.S. PATENT DOCUMENTS

| | | | |
|---|---|---|---|
| 1,918,337 | 7/1933 | Jones | 137/493.9 |
| 2,317,923 | 4/1943 | Lebo et al. | 137/493.9 |
| 2,732,856 | 1/1956 | Jurs et al. | 137/493.8 |
| 2,879,786 | 3/1959 | La Delle Heideman | 137/493.9 |
| 3,235,225 | 2/1966 | Dickinson et al. | 137/493.9 |
| 3,269,411 | 8/1966 | Teston | 251/368 |
| 3,307,633 | 3/1967 | Newall | 251/175 |
| 3,394,732 | 7/1968 | Lisciani | 251/333 |

OTHER PUBLICATIONS

Product Data Sheet EV-510 Emergency Vent Model 94510, 5/1989, Shand and Jurs.
Product Data Sheet BV-020 Breather Valves Model 94020, Shand & Jurs (no date).

Primary Examiner—Stephen M. Hepperle
Attorney, Agent, or Firm—Frank J. Uxa, Jr.

[57] ABSTRACT

A valve assembly, particularly a breather valve assembly for fluid storage tanks, is described. This assembly comprises a valve housing including a fluid conduit and a valve seat defining a fluid outlet of the fluid conduit, and a pressure pallet sized and adapted to move away from the valve seat in response to an increased fluid pressure in the fluid conduit. A seal is provided and acts to effectively seal the fluid outlet against fluid flow from said fluid conduit when the seal is in contact with the valve seat. The seal which includes first and second flexible seal elements which are unsecured to the pressure pallet at or near their respective outer peripheries, is structured so that fluid from the fluid conduit is in the space between the first and second seal elements when the seal means is in contact with the valve seat.

20 Claims, 4 Drawing Sheets

SEALING VALVE ASSEMBLY

RELATED APPLICATION

This application is a continuation-in-part of application Ser. No. 448,874 filed Dec. 12, 1989 now abandoned.

BACKGROUND OF THE INVENTION

The present invention relates to valve assemblies, e.g., for use in connection with fluid-filled storage tanks, such as hydrocarbon product storage tanks. More particularly, the invention relates to valve assemblies which are useful in types of service in which the valve pallet or pallets are repeatedly seated and unseated, such as breather valves.

Maintaining the pressure in a fluid-filled storage tank within the desired operating range reduces the risk of damaging the tank and/or fire and/or explosion. One approach to achieving this beneficial goal is the use of a breather valve assembly mounted to the tank. Such breather valves often include a movable pressure pallet which allows excess pressure in the tank to be relieved and a movable vacuum pallet which allows atmospheric air to enter the tank to relieve any undesirably reduced pressure in the tank.

Such breather valve assemblies differ substantially in structure and use from emergency vents which are also often mounted on fluid-filled tanks. For example, whereas the breather valves include means for relieving both excess pressure and reduced pressure in the tank, the emergency vents provide only excess pressure relief. Also, the orientation of the movement of the pressure pallet away from and toward the valve seat in a breather valve assembly is controlled or guided quite rigorously so that the pressure pallet and valve seat are effectively and quite precisely aligned, and therefore, can be effectively sealed in spite of frequent and repeated movements of the pressure pallet away from and toward the valve seat. Also, the pressure pallet may be lifted only a small distance away from the valve seat. Thus, even with the tank "breathing" out excess pressure, the pressure pallet may be in close proximity in the valve seat. In contrast, an emergency vent is designed for relatively infrequent operation. When operated, the vent cover should be removed from the vent outlet as soon and as completely as possible. In addition, after operation of an emergency vent, it is often inspected to be sure the vent has returned to its closed position and is ready for further use. A breather valve may operate, i.e., the pressure pallet moves away from and toward the valve seat, many times before being inspected. In effect, a breather valve involves frequent relatively small, controlled movements of the pressure pallet relative to the valve seat whereas an emergency vent involves infrequent operation in which the vent cover is moved quickly and completely away from the vent outlet. Thus, while a hinge mechanism is often used in a emergency vent to allow quick and complete movement of the vent cover away from the vent outlet, such a mechanism is not preferred for controlling the orientation of the relative subtle movements of a pressure pallet vis-a-vis the valve seat in a breather valve assembly.

The differences between a breather valve assembly and an emergency vent are so substantial that it is not appropriate to use one's knowledge of one system to modify the other system.

A breather valve assembly is often set, e.g., using weights, springs or the like, to open at a predetermined pressure condition in the tank. In order to conserve the product in the tank and to avoid excessive emissions from the tank, the breather valve assembly should open at the predetermined pressure condition in the tank and should seal tightly after the pressure condition in the tank has been relieved. Many of the breather valve assemblies currently in use, e.g., which utilize conventional seals, such as washer-type seals which contact both the valve seat and the pressure pallet at the area of seal/seat contact, disadvantageously lose the ability to open at a predetermined pressure condition in the tank and seal tightly. After a period of use, these breather valves tend to allow the passage of fluid from the tank at all times or at least at tank pressures significantly below the predetermined tank pressure for the valve to open. Also, because the valves are repeatedly opened and closed, the seals tend to lose their effectiveness, which also leads to product leakage. A breather valve assembly with a new sealing mechanism would be advantageous.

SUMMARY OF THE INVENTION

A new valve assembly, in particular a breather valve assembly, has been discovered. This assembly, when mounted to, and in fluid communication with the fluid in, a fluid filled tank, provides an effective fluid seal between the fluid filled tank and the surrounding atmosphere even though the seal is frequently and repeatedly broken, e.g., to allow the tank to "breathe". The present valve assembly provides for effective control of the pressure at which the tank or vessel "breathes". That is, the present assembly is structured so that little or no fluid leakage from the tank occurs at tank pressures below the pressure at which the valve assembly is set to open. The feature reduces product losses from the tank and, also, reduces possibly harmful emissions from the tank. Moreover, this "no premature leakage" feature remains effective even after frequent and repeated opening and closing of the valve assembly. In addition, since the seal of the present valve assembly is particularly adaptable to easy and relatively inexpensive routine replacement, the overall, long term. effectiveness of the assembly is enhanced, or at least maintained, e.g., by replacing the seal before any loss of sealing effectiveness is apparent.

In one embodiment, the present valve assembly comprises a valve housing, a pressure pallet, and seal means. The valve housing includes a fluid conduit and a valve seat defining a fluid outlet of the fluid conduit. The valve housing is often mounted on a fluid filled tank so that the fluid conduit is in fluid communication with the interior, fluid filled space defined by the tank. The pressure pallet is sized and adapted to move away from the valve seat in response to increased fluid pressure in the fluid conduit.

The seal means is associated with, preferably secured to, the pressure pallet and acts to effectively seal the fluid outlet against fluid flow from the fluid conduit when the seal means is in contact with the valve seat. The seal means includes a first flexible seal element adapted to contact the valve seat and a second flexible seal element. The first and second seal elements are unsecured to the pressure pallet at or near the outer edges or peripheries of such seal elements. Preferably, the first and second flexible seal elements are secured together at or near their respective outer peripheries.

The seal means is structured so that fluid from the fluid conduit is in the space between the first and second seal elements, and preferably provides substantially the same pressure on both first and second seal elements, when the seal means is in contact with the valve seat. This is an important feature of the present invention since with fluid pressure on both seal elements of the seal means, the pressure pallet and seal means move away from the valve seat and fluid from the fluid conduit exits through the fluid outlet substantially only when a given, preferably predetermined, minimum fluid pressure exists in the fluid conduit. In other words, this feature acts to reduce the amount and/or frequency of fluid escaping through the fluid outlet prematurely, i.e., at a fluid pressure in the fluid conduit below the given minimum pressure, for example, the pressure at which the valve assembly is set to allow fluid from the fluid conduit to escape or pass through the fluid outlet. Since the first and second seal elements are not permanently secured to the pressure pallet, the seal means can be easily and routinely replaced, e.g., without having to replace the pallet as well. This is a substantial advantage, for example, by reducing the cost and time required to maintain the valve assembly operating at high effectiveness.

An orientation means, preferably other than a hinge mechanism, may be, and preferably is, provided to control the orientation of the pressure pallet as it moves away from and toward the valve seat. A particularly useful embodiment involves a pressure pallet which includes an elongated stem which extends away from the valve seat. In this construction, the orientation means preferably includes a stem guide sized and located to receive at least a portion of the stem as the pressure pallet moves away from the valve seat. More preferably, in this construction, the assembly further comprises a plurality of elongated guide members around the pressure pallet. These guide members act, together with the stem guide, to control the orientation of the pressure pallet as it moves away from or toward the valve seat. This pressure pallet orientation system effectively and quite precisely controls the orientation of the movement of the pressure pallet and, in so doing, cooperates with the present seal means so that the present valve assembly functions effectively, even after repeated and/or frequent use.

The seal means is preferably located in the present assembly so that the area of the second sealing element directly opposite the area of the first sealing element which contacts the valve seat is out of contact with the first sealing element when the first sealing element is in contact with the valve seat. Preferably, the present assembly includes a means acting to maintain a fluid space between the first and second flexible seal elements when the first seal element is in contact with the valve seat. This fluid space, which need not encompass the entire space between the two seal elements, extends across the area of contact between the first seal means and the valve seat.

A particularly useful embodiment involves a seal means which comprises seal elements including a sheet or film of polymeric material, preferably thermoplastic polymeric material. The polymeric material chosen for use in the present seal means is preferably substantially inert in the fluid environment or environments to which it is to be exposed during use. Thus, for example, the polymeric material preferably is substantially inert in the ambient atmosphere and in an atmosphere of the fluid from the tank to which the present valve assembly is mounted. One particularly useful polymeric material, e.g., for use with tanks containing hydrocarbons, is polytetrafluoroethylene.

In one embodiment, the present valve assembly further comprises a second valve seat spaced apart from the valve seat, described above. This second valve seat defines a fluid inlet of the fluid conduit. In this embodiment, a vacuum pallet is sized and adapted to move away from the second valve seat in response to a decreased fluid pressure in the fluid conduit. With both a pressure pallet and a vacuum pallet, the present valve assembly is adapted to be used as a breather valve, e.g., for a fluid-filled storage tank or the like.

The vacuum pallet may be, and preferably is, associated with a second seal means which effectively seals the fluid conduit against fluid flow in through the fluid inlet when the second seal means is in contact with the second valve seat. Although the second seal means may have the same structure as the seal means previously described, it is preferred that the second seal means be differently structured. One example of a useful second seal means is a conventionally configured washer-type seal which is secured to the vacuum pallet. Also, a hinge mechanism may be associated with the vacuum pallet. This hinge mechanism acts to control the orientation of the vacuum pallet as it moves away from or toward the second valve seat.

Many of the concerns which require consideration in designing and structuring the pressure pallet and related components are not as important, if at all, in designing and structuring the vacuum pallet and related components. A defective or inefficient pressure pallet seal produces product losses and/or excessive emissions. This is not the case with a defective or inefficient vacuum pallet seal. Thus, much more care must be given to properly configuring the pressure pallet seal and controlling the orientation of the pressure pallet movement. The present valve assembly provides for both pressure pallet seal construction and pressure pallet movement orientation so that outstanding valve performance is achieved.

These and other aspects and advantages of the present invention are set forth in the following detailed description and claims, particularly when considered in conjunction with the accompanying drawings in which like parts bear like reference numerals.

DETAILED DESCRIPTION OF THE DRAWINGS

Figure 4:
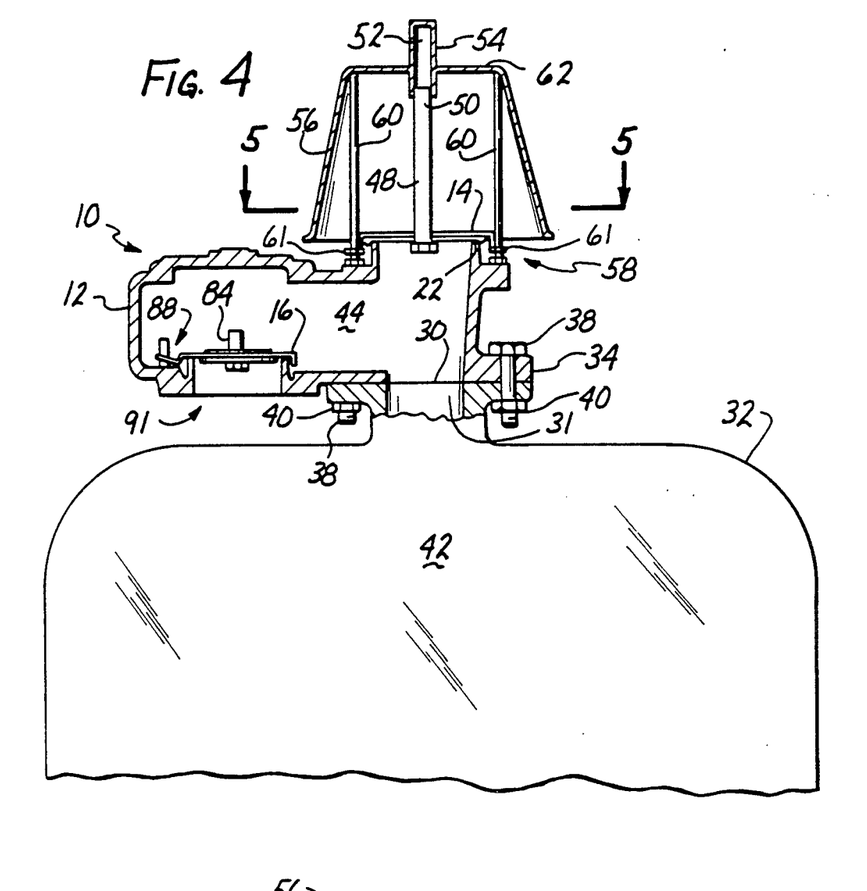
FIG. 4 is a cross-sectional view, taken generally along an axial plane, of the embodiment shown in FIG. 1 mounted to a fluid-filled storage tank.
Figure 5:
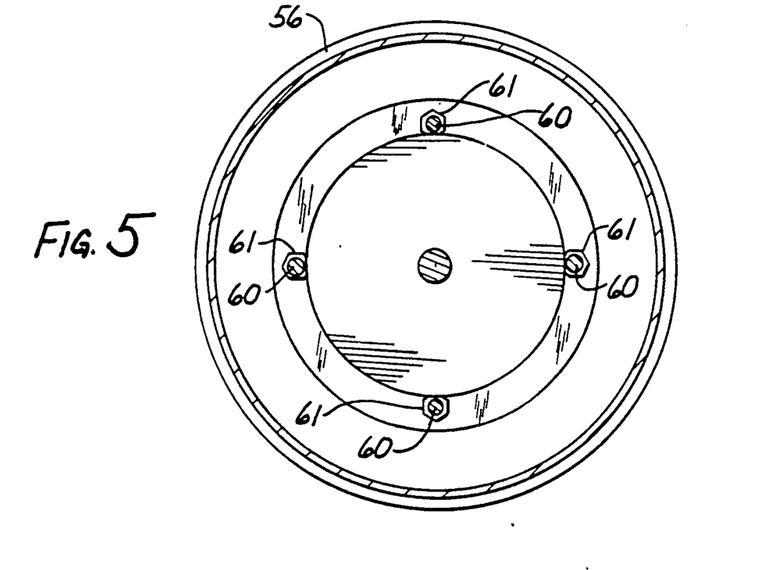
FIG. 5 is a cross-sectional view taken generally along line 5—5 of FIG. 4.

Referring now to the drawings, a breather valve assembly, shown generally at 10, includes a valve housing 12, a pressure pallet 14, a vacuum pallet 16, a pressure seal, shown generally at 18, and a vacuum seal 20. Valve housing 12 includes a pressure seat 22 which defines a circular pressure outlet 24. In addition, valve housing 12 includes a vacuum seat 26 which defines a circular air inlet 28. As best seen in FIG. 4, valve housing 12 defines a circular opening 30 which is placed in abutting relation to a top opening 31 of fluid-filled tank 32. Valve housing 12 includes an outwardly extending flange 34 which includes a plurality of through holes 36 (only one shown) located around opening 30. Valve housing 12 is mounted onto tank 32 and secured in place by a plurality of bolts 38 and nuts 40 located in association with through holes 36. In this manner, the fluid filled interior 42 of tank 32 is in fluid communication with the hollow interior 44 of valve housing 12.

Pressure pallet 14 includes a centrally located circular hole 46 through which is placed elongated valve stem 48. Valve stem 48 is welded or otherwise secured to pressure pallet 14 and extends outwardly away from pressure pallet 14 and valve housing 12. The far end 50 of valve stem 48 is captured within the elongated hollow space 52 defined by stem guide 54. Stem guide 54 is welded or otherwise secured to valve hood 56 which substantially covers top opening 30 of valve housing 12 and has a bottom end opening 58. The valve hood 56 is supported by a series of four (4) guide rods 60 which are affixed to valve housing 12 and are joined to the top 62 of valve hood 56. A series of stop nuts 61 are secured, e.g., welded, to guide rods 60, one stop nut 61 for each guide rod 60, at an appropriate position so as to come into contact with the side wall 74 of pressure pallet 14, thereby stopping the movement of pressure pallet 14 toward pressure seat 22. Restricting the movement of pressure pallet 14 toward pressure seat 22 facilitates the functioning of breather valve assembly 10, as is discussed hereinafter.

Figure 1:
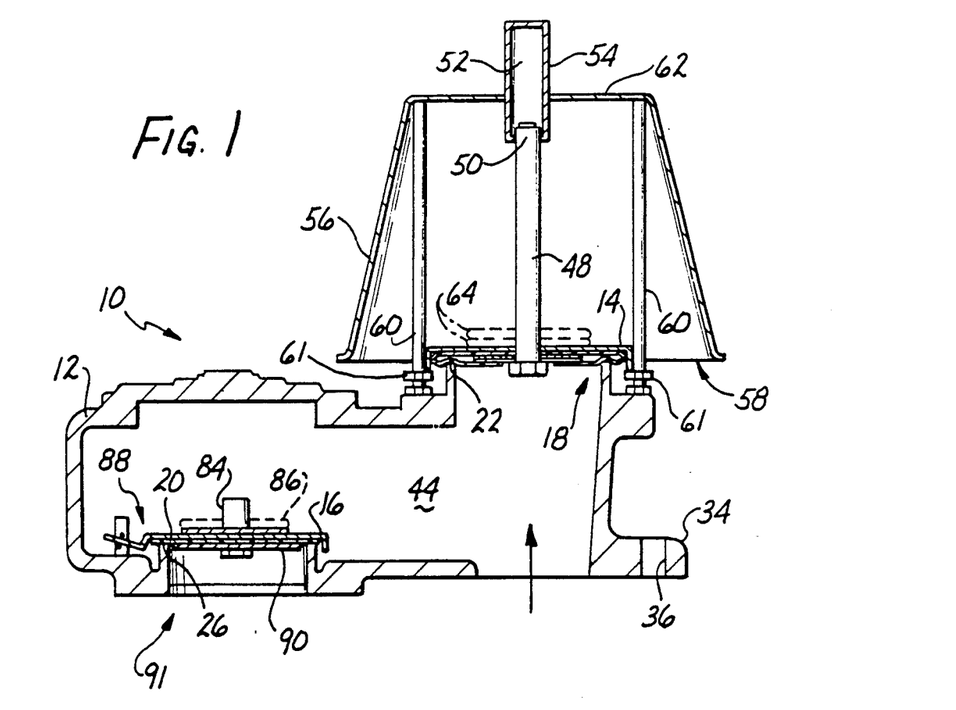
FIG. 1 is a cross-sectional view, taken generally along an axial plane, of one embodiment of the valve assembly of the present invention.
Figure 2:
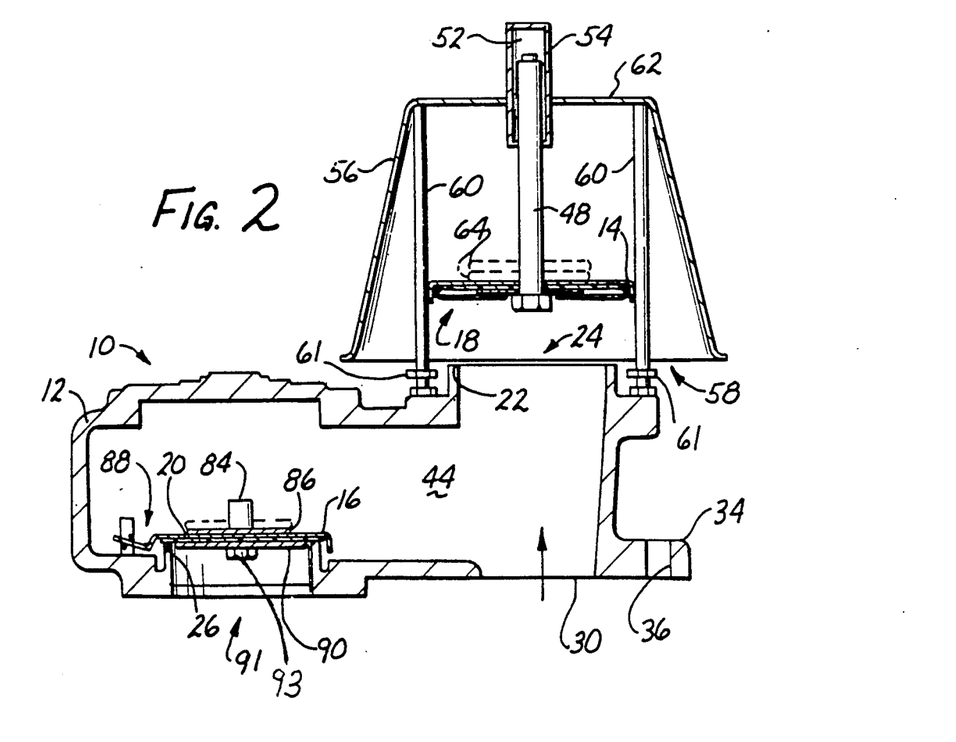
FIG. 2 is a cross-sectional view, taken generally along an axial plane, of the embodiment shown in FIG. 1 with the pressure pallet unseated.
Figure 3:
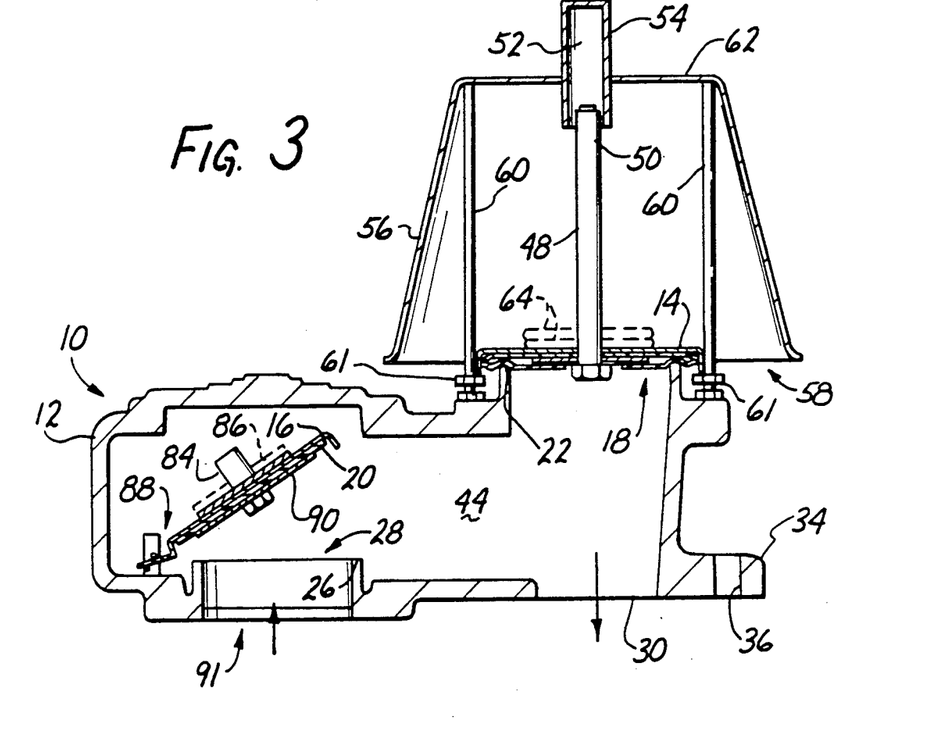
FIG. 3 is a cross-sectional view, taken generally along an axial plane, of the embodiment shown in FIG. 1 with the vacuum pallet unseated.

One or more weights 64 are placed on top of pressure pallet 14 and act to control the amount of force, i.e., fluid pressure, required to lift pressure pallet 14 and seal 18 from pressure seat 22. Alternately, other means can be employed to control the amount of force required to lift pressure pallet 14 and seal 18 from pressure seat 22. For example, pressure pallet 14 can be spring loaded, i.e., associated with a spring member which acts to urge pressure pallet 14 toward pressure seat 22. For illustration clarity, the weights 64 are not shown in FIGS. 4 to 9. However, it is understood that such weights are present, as illustrated in FIGS. 1 to 3.

Figure 6:
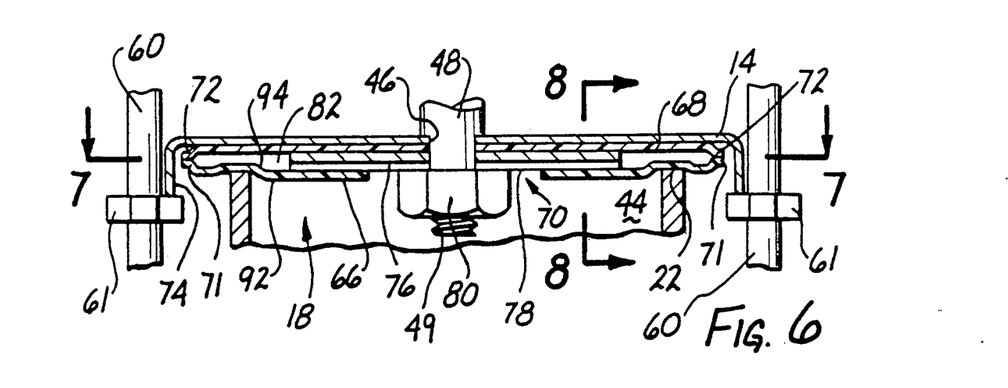
FIG. 6 is a detailed cross-sectional view, taken generally along an axial plane, of certain components of the embodiment shown in FIG. 1.
Figure 7:
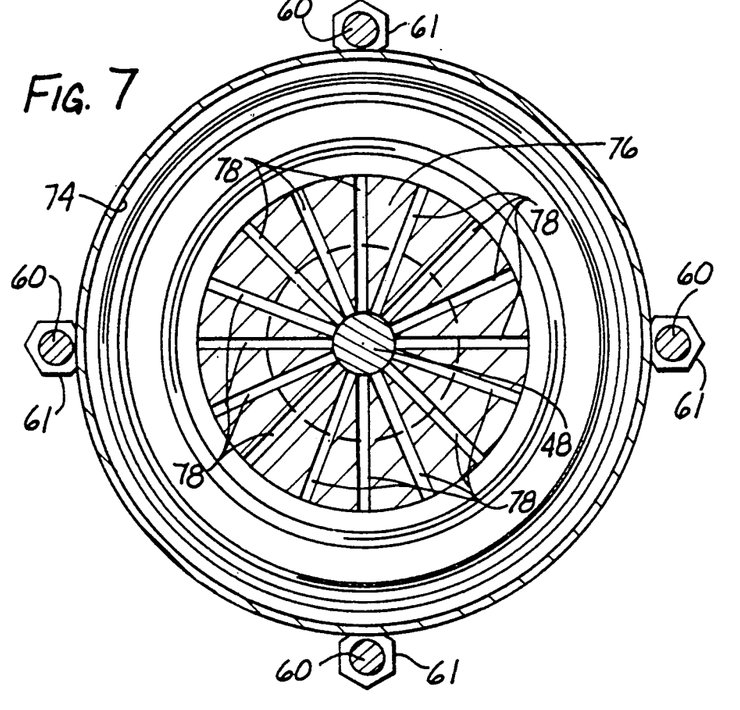
FIG. 7 is a cross-sectional view taken generally along line 7—7 of FIG. 6.
Figure 8:
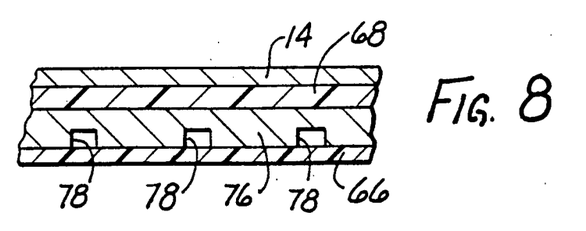
FIG. 8 is a cross-sectional view taken generally along line 8—8 of FIG. 6.

Referring now to FIGS. 6, 7 and 8, pressure seal 18 includes a first flexible sheet 66 and a second flexible sheet 68, each of which is made of polytetrafluoroethylene. First and second sheets 66 and 68 are constructed, e.g., have sufficient thickness, so as to be able to withstand the pressure or pressures to which they are exposed in the use of valve assembly 10 without significant damage, e.g., fluid leaks. First sheet 66 is generally circular and has a relatively large central opening 70. Second sheet 68 also is generally circular and has a smaller central opening sized so that the downwardly extending portion of valve stem 48 can pass therethrough. First and second sheets 66 and 68 are sealed together at their outer ends or peripheries 71 and 72. These components can be sealed together in any suitable manner, e.g., using heat, adhesives and/or other sealing techniques, in particular using heat sealing techniques. In any event, a fluid tight seal is formed between first and second sheets 66 and 68 around the entire circumference of the outer ends or peripheries 71 and 72. However, such outer ends or peripheries 71 and 72 are not secured to pressure pallet 14. This is an important feature of the present invention. Since the outer ends or peripheries 71 and 72 are not secured to pressure pallet 14, the seal 18 can be easily and relatively inexpensively replaced, e.g., during normal preventative maintenance, without having to extensively work on, or even replace, the pressure pallet 14. In this manner the seal 18 is routinely replaced so that the effectiveness of the breather valve assembly 10 is better maintained over long periods of time.

A disc 76 is included in the space between first and second sheets 66 and 68. This disc 76 is generally circular in configuration, but is smaller than either first or second sheets 66 and 68. Disc 76 includes a central opening sized so that the downwardly extending portion of valve stem 48 can pass therethrough. A series of radially extending slots 78 are located in disc 76. These slots 78 are open at the outer perimeter of disc 76. Alternately the slots 78 can extend completely through disc 76 provided that they do not extend all the way to the center of disc 76.

Seal 18 is assembled as follows. After first and second sheets 66 and 68 are secured together, disc 76 is placed on the downwardly extending portion of valve stem 48 with the slots 78 facing downward. Finally, threaded nut 80 is placed on the threaded downwardly extending end 49 of the valve stem 48 and secured thereto, e.g., tightened thereon. With pressure seal 18 so assembled, an annular space 82 is formed between first and second sheets 66 and 68. Slots 78 provide fluid communication between hollow interior 44 of valve housing 12 and annular space 82.

Vacuum pallet 16 is generally circular in configuration and includes a centrally located hole in which is secured, e.g., welded or the like, a short stem 84. The portion of short stem 84 extending upwardly away from vacuum pallet 16 may be used so that one or more weights 86 are placed thereon. Weights 86 act to control the amount of force. i.e., fluid pressure differential across vacuum pallet 16, required to lift vacuum pallet 16 and vacuum seal 20 from vacuum seat 26. Alternately, other means can be employed to control the amount of force required to lift vacuum pallet 16 and vacuum seal 20 from vacuum seat 26. For example, vacuum pallet 16 can be spring loaded, i.e., associated with a spring member which acts to urge vacuum pallet 16 toward vacuum seat 26. For illustration clarity, the weights 86 are not shown in FIG. 4. However, it is understood that such weights are present as illustrated in FIGS. 1 to 3.

Vacuum pallet 16 is connected to a hinge mechanism, shown generally at 88, which is used to control the orientation of the movement of vacuum pallet 16 away from or toward vacuum seat 26.

Vacuum seal 20 is a conventional washer having a centrally located hole therethrough. This seal 20 is placed around the downwardly depending portion of short stem 84. Another support washer 90, also with a centrally located hole, is placed on short stem 84 adjacent to seal 20. Finally, a threaded nut 93 is matingly engaged onto the threaded end of short stem 84 and tightened in place. Seal 20 is now ready for use. With breather valve assembly 10 mounted on tank 32, the opening 91 of valve housing 12 below vacuum seat 26 is exposed to the ambient atmosphere.

The breather valve assembly 10 functions as follows. Breather valve assembly 10 is mounted onto tank 32 as shown in FIG. 4 and as described above. Before this mounting occurs, a predetermined number of weights 64 (i.e., a predetermined amount of weight) is placed on pressure pallet 14 and a predetermined number of weights 86 (i.e., a predetermined amount of weight) is placed on vacuum pallet 16. The weights 64 and 86 which are included are predetermined based on the particular application involved and in effect set the breather valve assembly 10 to maintain the fluid pressure in the interior 42 of tank 32 to within a certain predetermined range.

With both seal 18 contacting pressure seat 22 and vacuum seal 20 contacting vacuum seat 26, the breather valve assembly 10 is completely closed and fluid tight. That is, no fluid from interior 42 escapes through breather valve assembly 10 nor does any fluid, i.e., atmospheric air, enter through breather valve assembly 10. In this configuration, and with particular reference to FIG. 6, the annular space 82 has substantially the same fluid pressure as the hollow interior 44 of valve housing 12 and the interior 42 of tank 32. Pressure seat 22 contacts and distorts to some extent first sheet 66. However, stop nuts 61 contact side wall 74 of pressure pallet 14 preventing pressure pallet 14 from moving any closer to pressure seat 22. Thus, even at the point of contact between pressure seat 22 and first seat 66 there is still a fluid space between first sheet 66 and second sheet 68 so that pressure seat 22 does not even indirectly come into solid contact with the second sheet 68 and the pressure pallet 14. Also, the annular space 82 extends radially outwardly from the pressure seat 22 so that there is, in effect, fluid pressure from tank 32 in annular space 82 pushing down and around pressure seat 22. This configuration, in which fluid pressure from tank 32 is present on both the bottom surface 92 and the top surface 94 of first sheet 66, provides a very effective vapor seal. One particular advantage of this seal is control of the pressure at which the seal 18 leaves or moves out of contact with the pressure seat 22. Thus, very effective control of the pressure at which material from tank 32 exhausts through pressure pallet 14 is provided.

With specific reference to FIG. 2, at the point where the pressure inside tank 32 surpasses the predetermined, e.g., safe, pressure, seal 18 is lifted, along with pressure pallet 14, out of contact with pressure seat 22. At this point, fluid from inside tank 32 escapes through pressure outlet 24 and the bottom opening 58 of valve hood 56. The orientation of pressure pallet 14 as it moves away from pressure seat 22 is very carefully controlled. Thus, as pressure pallet 14 moves further away from pressure seat 22, the far end 50 of valve stem 48 moves further into hollow space 52. In addition, the pressure pallet 14 is confined between the guide rods 60. This orientation control system provides not only for control of the movement of pressure pallet 14 away from pressure seat 22, but also ensures that seal 18 correctly seats on pressure seat 22 once the pressure in tank 32 has been reduced to below the predetermined pressure.

With particular reference to FIG. 3, the operation of vacuum pallet 16 is such that when a reduced pressure, e.g. vacuum, condition (below a predetermined maximum pressure) exists in tank 32, atmospheric air forces vacuum pallet 16 and vacuum seal 20 out of contact with vacuum seal 26 so that vacuum pallet 16 swings around hinge mechanism 88 to allow atmospheric air to enter tank 32. Once the reduced pressure condition has been relieved, vacuum pallet 16 swings back on hinge mechanism 88 so that vacuum seal 20 contacts vacuum seat 26, thus closing valve assembly 10 to atmospheric air.

Figure 9:
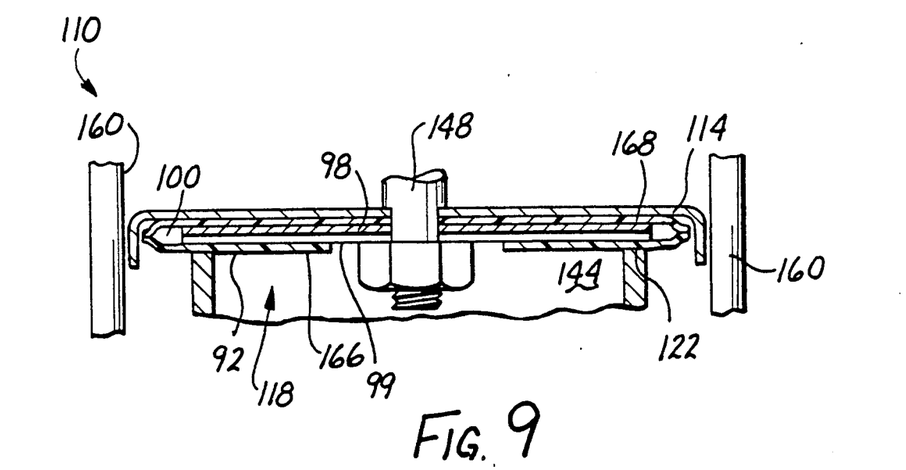
FIG. 9 is a detailed cross-sectional view, taken generally along an axial plane, of certain components of an alternate embodiment of a valve assembly of the present invention.

FIG. 9 shows certain components of an alternate embodiment. Except as expressly noted herein, this alternate embodiment of a breather valve assembly, shown generally at 110, is structured and functions in a manner substantially similar to breather valve assembly 10. Components of breather valve assembly 110 which correspond to components of breather valve assembly 10 are referred to by corresponding reference numbers increased by 100.

The primary difference between the breather valve assemblies 10 and 110 is that breather valve assembly 110 includes an extended disc 98 instead of disc 76, and does not include any stop nuts on guide rods 160. Extended disc 98 is structured like disc 76 except that its outer periphery extends beyond the area of contact between pressure seat 122 and first flexible sheet 166. Extended disc 98 includes a plurality of radially extending slots 99, structured similarly to slots 78. Extended disc 98 is secured to valve stem 148 and pressure pallet 114 in a manner similar to the way disc 76 is secured to valve stem 48 and pressure pallet 14.

Extended disc 98 acts to prevent first and second sheets 166 and 168 from coming into direct contact with each other as the result of pressure seat 122 contacting first sheet 166 of seal 118. Thus, even when pressure seat 122 is in contact with first sheet 166, fluid communication is maintained between interior 144 and outer annular space 100 through slots 99. In this manner, as with breather valve assembly 10, fluid pressure from interior 144 facilitates the operation of breather valve assembly 110, and in particular the sealing of pressure seat 122 and first sheet 166.

Breather valve assemblies 10 and 110 are structured to operate, e.g. with the vacuum pallets and in particular the pressure pallets opening and closing frequently and repeatedly without inspection between operations. These breather valve assemblies have been found to be very effective in this type of operation. In particular, such breather valve assemblies have been found to very effectively control the pressure at which fluid from the tank is allowed to exit through the pressure outlet. For example, substantially no premature leaking at lower tank pressures occurs. This precise control of the "breathing" pressure provides for reduced losses of valuable product, e.g., gasoline, volatile hydrocarbons or the like, from the tank, as well as minimizing the emissions from the tank. In addition, since the pressure seal is not permanently secured to the pressure pallet, the seal can be easily, and relatively inexpensively routinely replaced so that the overall, long term effectiveness of such breather valve assemblies is enhanced.

While this invention has been described with respect to various specific examples and embodiments, it is to be understood that the invention is not limited thereto and that it can be variously practiced within the scope of the following claims.

What is claimed is:

1. A valve assembly comprising:
   a valve housing including a fluid conduit and a valve seat defining a fluid outlet of said fluid conduit;
   a pressure pallet sized and adapted to move away from said valve seat in response to an increased fluid pressure in said fluid conduit; and
   seal means associated with said pressure pallet and acting to effectively seal said fluid outlet against fluid flow from said fluid conduit when said seal means is in contact with said valve seat, said seal means including a first flexible seal element having an outer periphery and being adapted to contact said valve seat and a second flexible seal element having an outer periphery, said first and second flexible seal elements being unsecured to said pressure pallet near their respective outer peripheries, said seal means being structured so that fluid from said fluid conduit is in the space between said first and second seal elements when said seal means is in contact with said valve seat.

2. The assembly of claim 1 wherein said first and second flexible seal elements are secured together at or near their respective outer peripheries.

3. The assembly of claim 1 wherein said seal means is structured so that fluid from said fluid conduit provides substantially the same pressure on both said first and second seal elements when said seal means is in contact with said valve seat.

4. The assembly of claim 1 wherein said pressure pallet is sized and adapted to move away from said valve seat in response to a predetermined increased fluid pressure in said conduit.

5. The assembly of claim 3 which further comprises one or more weights sized and adapted to be located on said pressure pallet so that when said weight or weights are located on said pressure pallet said weight or weights act to at least assist in controlling the level of increased fluid pressure in said conduit needed to move said pressure pallet away from said valve seat.

6. The assembly of claim 1 wherein said pressure pallet includes an elongated stem extending away from said valve seat, and which further comprises a stem guide sized and located to receive at least a portion of said elongated stem as said pressure pallet moves away from said valve seat; and a plurality of elongated guide members around said pressure pallet and acting, together with said stem guide, to control the orientation of said pressure pallet as it moves away from or toward said valve seat.

7. The assembly of claim 1 wherein said space between said first and second flexible seal element is exposed to the fluid pressure in said fluid conduit when said first flexible seal element is in contact with said valve seat.

8. The assembly of claim 1 wherein each of said first and second flexible seal elements comprises a sheet or film of polymeric material.

9. The assembly of claim 1 wherein each of said first and second flexible seal elements comprises a sheet or film of thermoplastic polymeric material.

10. The assembly of claim 8 wherein said sheet or film is made of polytetrafluoroethylene.

11. The assembly of claim 1 wherein said first and second flexible seal elements are heat sealed together at or near their respective outer peripheries.

12. The assembly of claim 1 wherein said valve housing is adapted to be secured to a fluid storage tank so that the fluid space of said tank is in fluid communication with said fluid conduit, said assembly being sized and adapted to be a breather valve for said tank.

13. The assembly of claim 1 which further comprises a vacuum pallet sized and adapted to move away from said second valve seat in response to a decreased fluid pressure in said fluid conduit.

14. A valve assembly comprising:
   a valve housing including a fluid conduit and a valve seat defining a fluid outlet of said fluid conduit;
   a pressure pallet sized and adapted to move away from said valve seat in response to an increased fluid pressure in said fluid conduit, said pressure pallet including an elongated stem extending away from said valve seat;
   a stem guide sized and located to receive at least a portion of said elongated stem as said pressure pallet moves away from said valve seat; and
   seal means associated with said pressure pallet and acting to effectively seal said fluid outlet against fluid flow from said fluid conduit when said seal means is in contact with said valve seat, said seal means including a first flexible seal element having an outer periphery and being adapted to contact said valve seat and a second flexible seal element having an outer periphery, said first and second flexible seal elements being unsecured to said pressure pallet at or near their respective outer peripheries, said seal means being structured so that fluid from said fluid conduit is in the space between said first and second seal elements when said seal means is in contact with said valve seat.

15. A valve assembly comprising:
   a valve housing including a fluid conduit and a valve seat defining a fluid outlet of said fluid conduit;
   a pressure pallet sized and adapted to move away from said valve seat in response to an increased fluid pressure in said fluid conduit;
   seal means associated with said pressure pallet and acting to effectively seal said fluid outlet against fluid flow from said fluid conduit when said seal means is in contact with said valve seat, said seal means including a first flexible seal element having an outer periphery and being adapted to contact said valve seat and a second flexible seal element having an outer periphery, said first and second flexible seal elements being unsecured to said pressure pallet near their respective outer peripheries, said seal means being structured so that fluid from said fluid conduit is in the space between said first and second seal elements when said seal means is in contact with said valve seat; and
   means acting to maintain a fluid space between said first and second seal elements when said seal means is in contact with said valve seat, said fluid space extending across the area of contact between the seal means and the valve seat.

16. The assembly of claim 15 wherein said means is positioned so as to directly contact said pressure pallet to restrict the movement of said pressure pallet toward said valve seat.

17. The assembly of claim 15 wherein said means is positioned at least partially within said space between said first and second flexible seal elements.

18. The assembly of claim 17 wherein said means comprises a disc including a plurality of slots which provide fluid communication between said fluid conduit and said space between said first and second seal elements where said seal means is in contact with said valve seat.

19. The assembly of claim 15 wherein said first and second flexible seal elements are secured together at or near their respective outer peripheries.

20. The assembly of claim 15 wherein said valve housing is adapted to be secured to a fluid storage tank so that the fluid space of said tank is in fluid communication with said fluid conduit, said assembly being sized and adapted to be a breather valve for said tank.

* * * * *